(12) United States Patent
Parikh

(10) Patent No.: US 7,849,702 B2
(45) Date of Patent: Dec. 14, 2010

(54) COMBINED CABIN AIR AND HEAT EXCHANGER RAM AIR INLETS FOR AIRCRAFT ENVIRONMENTAL CONTROL SYSTEMS, AND ASSOCIATED METHODS OF USE

(75) Inventor: Pradip G. Parikh, Renton, WA (US)

(73) Assignee: The Boeing Company, Chicago, IL (US)

( * ) Notice: Subject to any disclaimer, the term of this patent is extended or adjusted under 35 U.S.C. 154(b) by 448 days.

(21) Appl. No.: 11/765,748

(22) Filed: Jun. 20, 2007

(65) Prior Publication Data
US 2008/0314060 A1 Dec. 25, 2008

(51) Int. Cl.
B60H 1/32 (2006.01)
F25D 9/00 (2006.01)
B64D 33/02 (2006.01)

(52) U.S. Cl. .............................. 62/241; 62/239; 62/402; 244/53 B

(58) Field of Classification Search .................... 62/239, 62/241, 402; 244/53 B
See application file for complete search history.

(56) References Cited

U.S. PATENT DOCUMENTS

| | | | | |
|---|---|---|---|---|
| 2,767,561 A | * | 10/1956 | Seeger | 62/241 |
| 3,265,331 A | | 8/1966 | Miles | |
| 3,430,640 A | | 3/1969 | Lennard | |
| 3,439,692 A | | 4/1969 | Pike | |
| 3,711,044 A | | 1/1973 | Matulich | |
| 4,262,495 A | * | 4/1981 | Gupta et al. | 62/402 |
| 4,307,743 A | | 12/1981 | Dunn | |
| 4,419,926 A | * | 12/1983 | Cronin et al. | 454/74 |
| 4,569,494 A | | 2/1986 | Sakata | |
| 4,836,473 A | * | 6/1989 | Aulehla et al. | 244/130 |
| 5,697,394 A | * | 12/1997 | Smith et al. | 137/15.1 |
| 5,704,218 A | * | 1/1998 | Christians et al. | 62/172 |
| 5,709,103 A | * | 1/1998 | Williams | 62/402 |

(Continued)

FOREIGN PATENT DOCUMENTS

EP 0358347 3/1990

OTHER PUBLICATIONS

Environmental Control System; 7 pgs; http://en.wikipedia.org/wiki/Environmental_Control_System; [accessed May 12, 2007].

*Primary Examiner*—William E Tapolcai
*Assistant Examiner*—Filip Zec
(74) *Attorney, Agent, or Firm*—Perkins Coie LLP

(57) ABSTRACT

Aircraft environmental control systems having a single ram air inlet providing air to both cabin air compressors and associated heat exchangers are disclosed herein. In one embodiment, and environmental control system for use with an aircraft includes a ram air inlet, an air conditioning pack, and an associated heat exchanger. In this embodiment, the ram air inlet provides a first portion of air to the air conditioning pack, and a second portion of air to the associated heat exchanger. The first portion of air flows from the air conditioning pack and through the heat exchanger before flowing into an aircraft cabin. The second portion of air from the ram air inlet cools the first portion of air in the heat exchanger before exiting the aircraft through a ram air outlet. The inlet and outlet can be modulated on an optimized schedule to minimize the net drag of the ram system.

22 Claims, 8 Drawing Sheets

U.S. PATENT DOCUMENTS

| | | | |
|---|---|---|---|
| 5,860,283 A * | 1/1999 | Coleman et al. | 62/87 |
| 5,967,169 A | 10/1999 | Engel et al. | |
| 5,967,461 A * | 10/1999 | Farrington | 244/118.5 |
| 6,199,387 B1 * | 3/2001 | Sauterleute | 62/87 |
| 6,257,003 B1 * | 7/2001 | Hipsky | 62/88 |
| 6,349,899 B1 | 2/2002 | Ralston | |
| 6,390,417 B1 * | 5/2002 | Yoshino | 244/203 |
| 6,415,621 B2 * | 7/2002 | Buchholz et al. | 62/402 |
| 6,434,968 B2 * | 8/2002 | Buchholz et al. | 62/401 |
| 6,526,775 B1 * | 3/2003 | Asfia et al. | 62/402 |
| 6,681,592 B1 | 1/2004 | Lents et al. | |
| 6,704,625 B2 | 3/2004 | Albero | |
| 6,901,737 B2 | 6/2005 | Schnoor | |
| 6,928,832 B2 | 8/2005 | Lents et al. | |
| 6,981,388 B2 * | 1/2006 | Brutscher et al. | 62/401 |
| 7,014,144 B2 | 3/2006 | Hein et al. | |
| 2008/0135689 A1 | 6/2008 | Parikh | |

* cited by examiner ial control systems that provide conditioned air for the passengers and crew and for other purposes. Conventional environmental control systems (ECSs) use air that is "bled" off the compressor of each jet engine upstream of the combustor. The temperature and pressure of this "bleed air" can vary widely depending on the thrust setting of the engine. For this reason, ECSs typically include one or more heat exchangers, compressors, and/or turbines to adjust the temperature and pressure of the air before it flows into the cabin.

COMBINED CABIN AIR AND HEAT EXCHANGER RAM AIR INLETS FOR AIRCRAFT ENVIRONMENTAL CONTROL SYSTEMS, AND ASSOCIATED METHODS OF USE

CROSS REFERENCE TO APPLICATION(S) INCORPORATED BY REFERENCE

Pending U.S. patent application Ser. No. 11/599,245, filed Nov. 13, 2006, and entitled "RAM AIR INLETS FOR USE WITH AIRCRAFT ENVIRONMENTAL CONTROL SYSTEMS AND OTHER AIRCRAFT AND NON-AIRCRAFT SYSTEMS," is incorporated into the present application in its entirety by reference.

TECHNICAL FIELD

The following disclosure relates generally to aircraft environmental control systems and, more particularly, to aircraft environmental control system air inlets and air outlets.

BACKGROUND

Commercial airliners and other conventional aircraft typically include environmental control systems that provide conditioned air for the passengers and crew and for other purposes. Conventional environmental control systems (ECSs) use air that is "bled" off the compressor of each jet engine upstream of the combustor. The temperature and pressure of this "bleed air" can vary widely depending on the thrust setting of the engine. For this reason, ECSs typically include one or more heat exchangers, compressors, and/or turbines to adjust the temperature and pressure of the air before it flows into the cabin.

Using engine bleed air for cabin air conditioning can reduce engine fuel efficiency. To avoid this result, some newer aircraft (such as the Boeing 787 aircraft) have "more electric" air conditioning systems that use outside air from ram air inlets for this purpose. Such systems, however, typically require at least two separate ram air inlets for each air conditioning pack. The first ram air inlet provides air to electric-motor-driven cabin air compressors, which supply high pressure air to the air conditioning pack. The second ram air inlet provides cooling air to the air conditioning pack heat exchanger. While having a dedicated high pressure recovery ram air inlet for the cabin air compressors can reduce the power requirements of compressors, the additional inlet adds drag, weight, cost and complexity to the aircraft which can offset gains in fuel efficiency.

SUMMARY

The following summary is provided for the benefit of the reader only, and is not intended to limit the invention as set forth by the claims in any way.

Various embodiments of the invention are directed generally toward aircraft environmental control systems (ECSs) having combined cabin air and heat exchanger ram air inlets. An ECS configured in accordance with one aspect of the disclosure includes a ram air inlet that provides a first portion of air to an air conditioning pack and a second portion of air to an associated heat exchanger. The first portion of air from the ram air inlet can flow from cabin air compressors to the air conditioning pack and through the heat exchanger before flowing into a cabin of the aircraft. The second portion of air from the ram air inlet can cool the first portion of air in the heat exchanger, before exiting the aircraft through a ram air outlet.

An aircraft configured in accordance with another aspect of the disclosure can include an ECS that provides air to an aircraft cabin. In this aspect of the disclosure, the ECS includes a ram air inlet having a variable inlet opening in flow communication with an inlet duct, and a ram air outlet having a variable outlet opening in flow communication with an exhaust duct. The ECS can further include an air conditioning pack that receives a first portion of air from the inlet duct, and a heat exchanger that receives the second portion of air from the inlet duct. The first portion of air flows from the air conditioning pack and through the heat exchanger before flowing into the aircraft cabin. The second portion of air flows through the heat exchanger to cool the first portion of air before flowing out the ram air outlet via the exhaust duct. In addition to the foregoing elements, the ECS can further include a controller operably coupled to the ram air inlet and ram air outlet. In this aspect of the disclosure, the controller automatically modulates at least one of the variable inlet opening and the variable outlet opening on a specific schedule during operation of the aircraft to reduce the aerodynamic drag associated with the ECS ram system and increase the air pressure recovery in the inlet duct.

A method for providing air to an aircraft cabin in accordance with a further aspect of the disclosure can include receiving a flow of outside air via an air inlet, and splitting the flow of outside air into a first air flow portion and a second air flow portion. The method can further include cooling the first air flow portion with the second air flow portion after compressing the first air flow portion, and directing the first air flow portion into the aircraft cabin after it has been cooled with the second air flow portion.

DETAILED DESCRIPTION

The following disclosure describes aircraft environmental control systems and associated methods of use. In one embodiment, an aircraft environmental control system (aircraft "ECS") includes a modulated ram air inlet that provides air to both a cabin air conditioning system and the air conditioning system heat exchanger. Certain details are set forth in the following description and in FIGS. 1-9 to provide a thorough understanding of various embodiments of the disclosure. Other details describing well-known structures and systems often associated with aircraft, aircraft ram air inlets, and aircraft ECSs, for example, are not set forth in the following disclosure to avoid unnecessarily obscuring the description of various embodiments of the disclosure.

Many of the details, dimensions, angles and other features shown in the Figures are merely illustrative of particular embodiments of the disclosure. Accordingly, other embodiments can have other details, dimensions, angles and features without departing from the spirit or scope of the present disclosure. In addition, further embodiments of the disclosure can be practiced without several of the details described below.

In the Figures, identical reference numbers identify identical, or at least generally similar, elements. To facilitate the discussion of any particular element, the most significant digit or digits of any reference number refer to the Figure in which that element is first introduced. For example, element 201 is first introduced and discussed with reference to FIG. 2.

Figure 1:
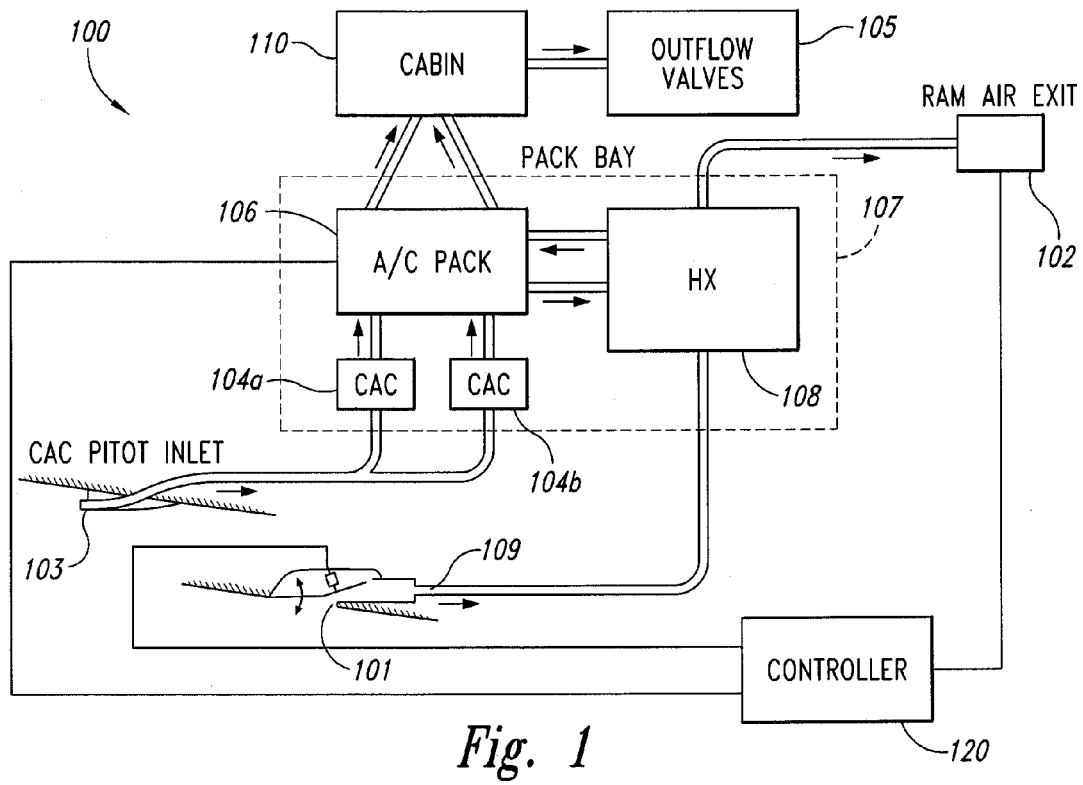
FIG. 1 is a schematic diagram of an aircraft environmental control system architecture configured in accordance with an embodiment of the disclosure.

FIG. 1 illustrates an aircraft ECS architecture 100 that receives outside air from a first ram air inlet 101 and a second ram air inlet 103. The first ram air inlet 101 can be a flush ram air inlet, and the second ram air inlet 103 can be a pitot-type ram air inlet. The ram air inlets 101 and 103 can be located in wing-body fairings on each side of the aircraft. In the illustrated embodiment, the second ram air inlet 103 provides high pressure air to a first cabin air compressor 104a and a second cabin air compressor 104b. The cabin air compressors 104 supply high pressure air to an air conditioning pack 106. The first ram air inlet 101 provides cooling air to an air conditioning pack heat exchanger 108. The air conditioning pack 106, the heat exchanger 108, and the cabin air compressors 104 can be carried in an air conditioning pack bay 107.

In operation, the second ram air inlet 103 provides high pressure air to the cabin air compressors 104. The cabin air compressors 104 compress the air before flowing it to the air conditioning pack 106. The air conditioning pack 106 can include air compressors, air expanders, air cycle machines, vapor cycle devices, and/or other air conditioning equipment known in the art for conditioning air. The air conditioning pack 106 conditions the air and directs it through the heat exchanger 108. The ram air from the first inlet 101 flows through the heat exchanger 108 to cool the air from the air conditioning pack 106. After passing through the heat exchanger 108, the air from the air conditioning pack 106 flows into an aircraft cabin 110. At least a portion of the air flowing through the cabin 110 is discharged via outflow valves 105. After flowing through the heat exchanger 108, the cooling air from the first ram air inlet 101 exits the aircraft via a ram air outlet 102.

In one embodiment, the first ram air inlet 101 can include a modulated inlet door, such as the modulated inlet door described in detail in pending U.S. patent application Ser. No. 11/599,245, and the ram air outlet 102 can include a variable opening. In this embodiment, the ECS architecture 100 can further include a controller 120 that is operably connected to the air conditioning pack 106, the first ram air inlet 101, and the ram air outlet 102. In operation, the controller 120 can automatically modulate the first ram air inlet 101 and/or the ram air outlet 102 to optimize or at least improve the air pressure recovery in an associated inlet duct 109. In addition or alternatively, the controller 120 can also modulate the first ram air inlet 101 and/or the ram air outlet 102 to reduce aerodynamic drag from the ECS ram system during flight.

Figure 2:
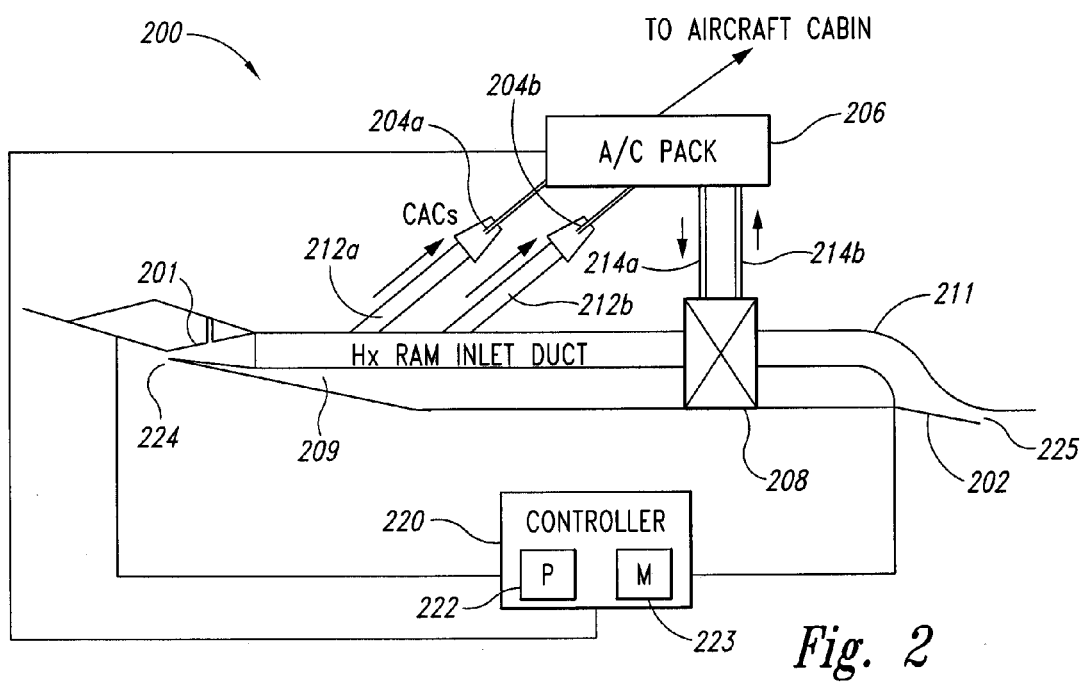
FIG. 2 is a schematic diagram of an aircraft environmental control system architecture configured in accordance with another embodiment of the disclosure.

FIG. 2 is a schematic diagram of an aircraft ECS architecture 200 configured in accordance with another embodiment of the disclosure. In this embodiment, the ECS architecture 200 includes a single ram air inlet 201 that provides outside air to both a heat exchanger 208 and to first and second cabin air compressor 204a and 204b. The ram air inlet 201 can include a modulated flush inlet having a variable inlet opening 224, such as the modulated inlet door described in detail in pending U.S. patent application Ser. No. 11/599,245 (see FIGS. 4A-4C and associated discussion). The incoming air flows from a common inlet duct 209 to the first cabin air compressor 204a via a first air passage 212a, and to the second cabin air compressor 204b via a second air passage 212b, after the flow has slowed to Mach numbers in the range of about 0.1 to about 0.2 through a diffuser area enlargement associated with the ram air inlet 201. The cabin air compressors 204 compress the inlet air before it flows into an air conditioning pack 206. The air conditioning pack 206 can include air cycle machines, vapor cycle devices, and/or other air conditioning equipment known in the art for conditioning the air before it flows into the cabin of the aircraft. As part of the air conditioning, the air flows from the air conditioning pack 206 through the heat exchanger 208 via a third air passage 214a and a fourth air passage 214b. The air flowing from the inlet duct 209 through the heat exchanger 208 is exhausted through an air outlet 202. The ram air outlet 202 can include a modulated outlet with a variable outlet opening 225 (see FIGS. 5A and 5B and associated discussion).

In another aspect of this embodiment, the environmental control system 200 can include a controller 220 operably connected to the ECS pack 206, the air inlet 201 and the air outlet 202. The controller 220 can include a processor 222 that executes computer-readable instructions stored on memory 223. The computer-readable instructions can cause the controller 220 to modulate the variable inlet opening associated with the air inlet 201 and the variable outlet opening associated with the air outlet 202 to achieve relatively high pressure recovery factors in the inlet duct 209, while simultaneously reducing the aerodynamic drag of the ram system as compared to, for example, the two ram air inlet system described above with reference to FIG. 1.

Figure 3:
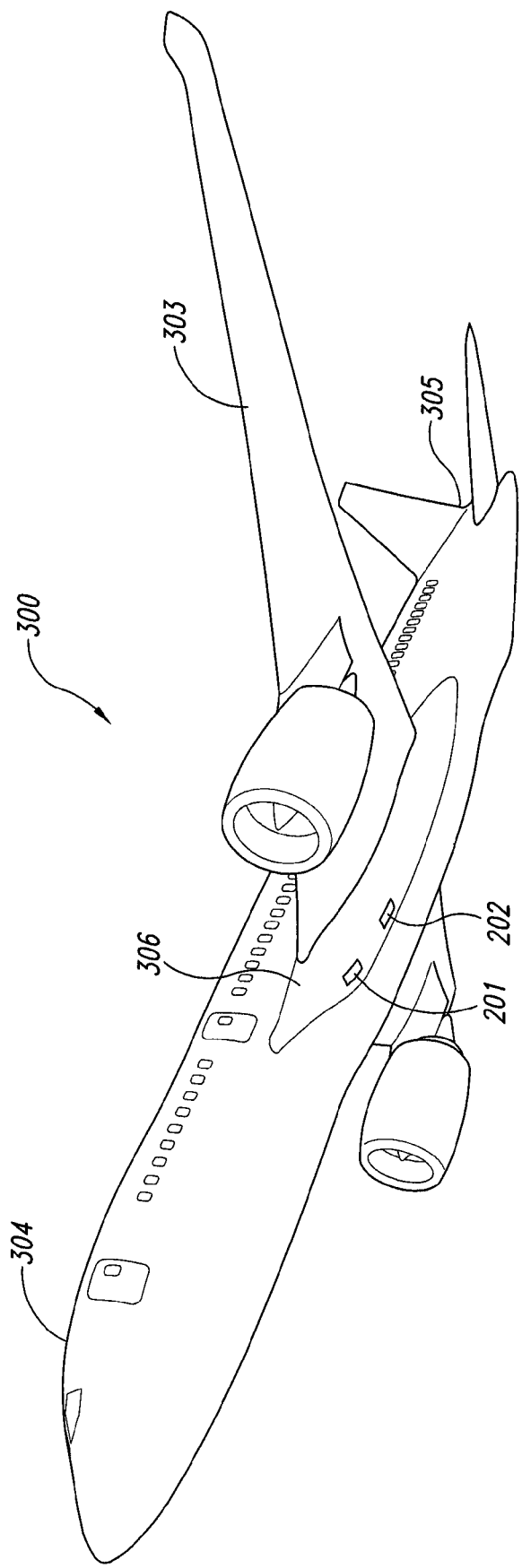
FIG. 3 is a bottom isometric view of an aircraft having an environmental control system with a ram air inlet and a ram air outlet configured in accordance with an embodiment of the disclosure.

FIG. 3 is a bottom isometric view of an aircraft 300 showing the ram air inlet 201 and the ram air outlet 202 of FIG. 2, in accordance with one embodiment of the disclosure. In this particular embodiment, the ram air inlet 201 is positioned on the underside of a wing-to-body fairing 306, and the ram air outlet 202 is positioned aft of the ram air inlet 201. In other embodiments, the ram air inlet 201 and/or the ram air outlet 202 can be located on other portions of the aircraft 300. For example, the ram air inlet 201 can be positioned in a positive pressure region of a fuselage 304, or in a similar region of a wing 303 or empennage 305. Although only one ram air inlet and one ram air outlet are shown in FIG. 3, the aircraft 300 can also include a similar ram air inlet/outlet combination on the other side of the fuselage 304.

Figure 4A:
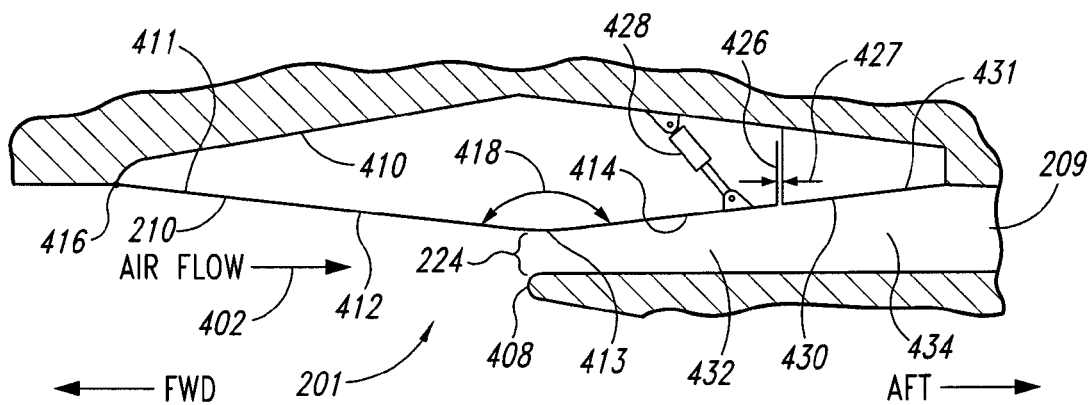
FIGS. 4A-4C are cross-sectional views of a portion of the aircraft of FIG. 3, illustrating a ram air inlet door configured in accordance with an embodiment of the disclosure.
Figure 4B:
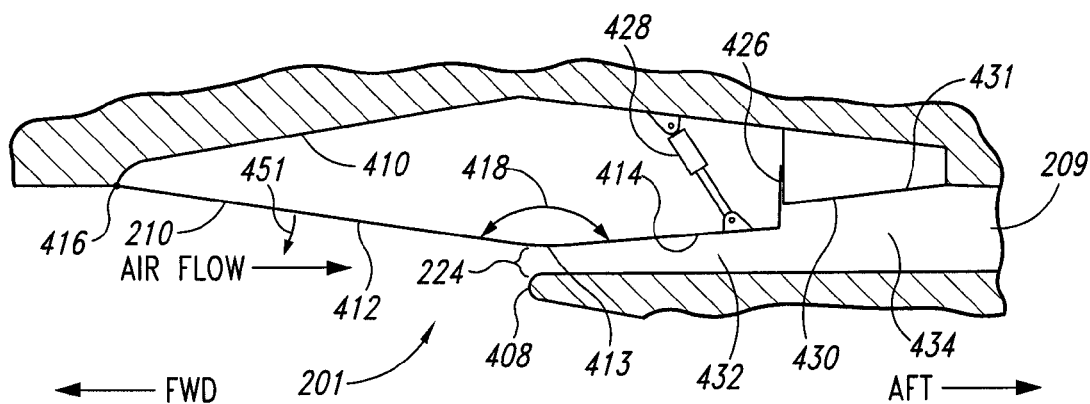
Figure 4C:
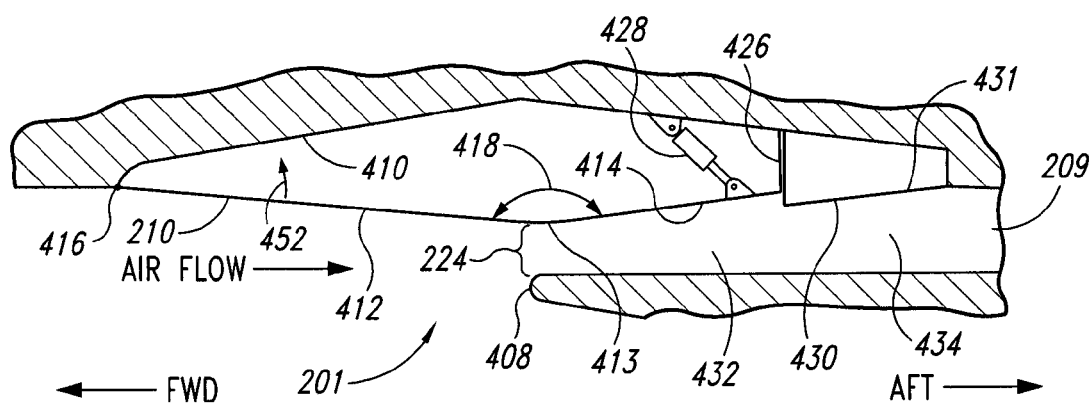

FIGS. 4A-4C are a series of cross-sectional side views of one embodiment of the ram air inlet 201 in various stages of operation. Referring first to FIG. 4A, the ram air inlet 201 includes an inlet housing 410 spaced apart from an inlet lip 408. A hinge 416 pivotally attaches a ram air inlet door 210 to the inlet housing 410. In this embodiment, the ram air inlet door 210 ("inlet door 210") is a "1-piece" door having a first surface portion 412 moveably positioned at least approximately forward or upstream of the inlet lip 408, a second surface portion 414 moveably positioned at least approximately aft or downstream of the inlet lip 408, and a transition region 413 spaced apart from the inlet lip 408 to form the variable "throat" or inlet opening 224 therebetween. The transition region 413 forms an angle 418 between the first surface portion 412 and the second surface portion 414. The angle 418 can be from about 130 degrees to about 178 degrees. For example, in one embodiment, the angle 418 can be from about 150 degrees to about 175 degrees. In another embodiment, the angle 418 can be from about 160 degrees to about 170 degrees. The inlet door 210 of this embodiment also includes a third surface portion 426 attached to an aft region of the second surface portion 414 and extending away from the second surface portion 414 toward the inlet housing 410.

Although the transition region 413 of the illustrated embodiment can at least approximate an edge where the first surface portion 412 and the second surface portion 414 meet, in other embodiments, the transition region 413 can include a more rounded or smoother transition region between these two surface portions. Thus, the transition region 413 will be understood to include sharp edges, rounded or curved transition regions, and/or other regions that can transition between the first surface portion 412 and the second surface portion 414. In addition, the term "inlet housing" is used herein for ease of reference only, and refers generally to the structure that receives and/or supports the inlet door 210. In this regard, the inlet housing 410 can include an enclosure but is not limited to an enclosure. Accordingly, in other embodiments, the inlet housing 410 can include other, more open arrangements of support structures.

In operation, ram air 402 flows through the inlet opening 224 and into a variable diffuser passage 432 formed by the second surface portion 414 and the opposing surface of the inlet lip 408. The ram air flows from the variable diffuser passage 432 into a fixed diffuser passage 434, before flowing into the inlet duct 209. The fixed diffuser passage 434 is formed by a fixed diffuser 431 having a fixed diffuser surface 430. As described in greater detail below, in operation, the second surface portion 414 of the inlet door 210 is optionally positionable in alignment with the fixed diffuser surface 430, as shown in FIG. 4A.

An actuator 428 is operably coupled between the inlet housing 410 and the inlet door 210. In one embodiment, the actuator 428 can be electrically driven. In other embodiments, however, the actuator 428 can utilize other types of power including, for example, hydraulic, pneumatic, and/or mechanical power. In this particular embodiment, the actuator 428 is pivotally attached to the second surface portion 414 of the inlet door 210 for direct actuation of the inlet door 210. In other embodiments, however, the actuator 428, and/or one or more other actuators, can be operably coupled to the inlet door 210 in other positions to pivot the inlet door 210 about the hinge 416 during operation.

In operation, the actuator 428 pivots the inlet door 210 about the hinge 416 to change the size of the inlet opening 224 and alter the flow of ram air to the inlet duct 209. The angle 418 between the first surface portion 412 and the second surface portion 414 is selected so that the ram air flow through the inlet opening 224 remains stable, or at least generally stable, throughout the flow regime as the inlet door 210 is modulated. When the inlet door 210 is in the position illustrated in FIG. 4A (e.g., a 100% open position), the second surface portion 414 is aligned, or at least approximately aligned, with the fixed diffuser surface 430. As illustrated in FIG. 4B, the actuator 428 can pivot the inlet door 210 in a first direction 451 about the hinge 416 to reduce the size of the inlet opening 224 and, accordingly, reduce the flow of ram air to the inlet duct 209. In this position, the third surface portion 426 of the inlet door 210 forms an aft facing surface or "air dam" that prevents high pressure air from the variable diffuser passage 432 from flowing back into the cavity between the inlet door 210 and the inlet housing 410. There is a relatively small (e.g., 0.05 inch to 0.10 inch) gap 427 (FIG. 4A) between the third surface portion 426 and the fixed diffuser 431 that prevents the pressure in the cavity between the inlet housing 410 and the inlet door 210 from dropping too low, thereby reducing static loads on the door during operation.

Referring next to FIG. 4C, the actuator 428 pivots the inlet door 210 in a second direction 452 about the hinge 416 to increase the inlet opening 224 and, accordingly, increase the flow of ram air to the inlet duct 209. With increasing mass flow rates, however, the pressure recovery performance of the inlet door 210 may decrease. For example, at high mass flow rates approaching the choke limits of the inlet opening 224, the performance of the inlet door 210 may be somewhat less than the performance of a conventional 2-piece inlet door because the 2-piece door has a larger throat area. In practice, however, most ram air inlets are designed with a substantial margin to inlet choking limits. As a result, the high mass flow rates where the recovery performance of the ram air inlet 201 drops off are often beyond the typical operating range. In addition, it may also be possible to delay the performance drop-off of the ram air inlet 201 to higher mass flow rates by increasing the throat area (i.e., the inlet opening 224) by approximately 10-15% beyond the point where the second surface portion 414 is aligned with the fixed diffuser 431. As shown in FIG. 4C, this results in a forward facing step at the fixed diffuser interface. Test data suggests that the recovery performance of the ram air inlet 201 with the inlet door 210 in this position is improved beyond that of the 100% open position illustrated in FIG. 4A when the ram air inlet 201 is operating at relatively high mass flow rates.

The present disclosure is not limited to the particular type of ram air inlet described above in reference to FIGS. 4A-4C. For example, various embodiments of the ram air ECS systems described herein can use other types of inlet doors. These doors can include 2-door modulated inlet configurations in which the forward and aft doors are connected by a hinge in the middle, such as those used on conventional commercial airplanes.

Figure 5A:
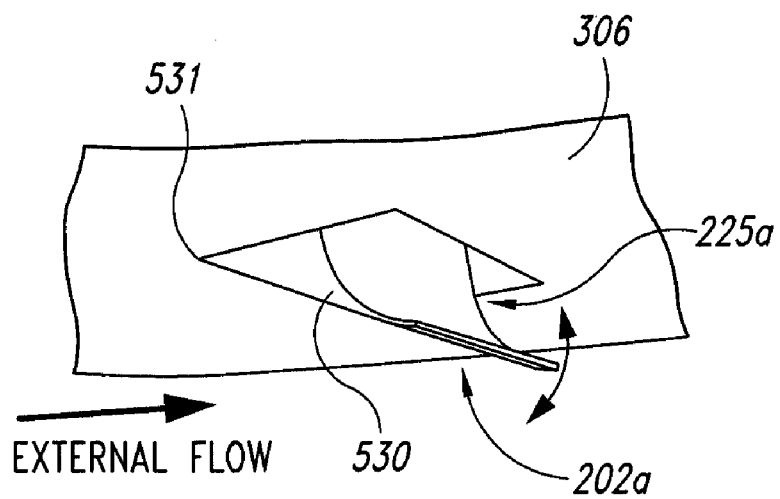
FIGS. 5A and 5B are bottom isometric views of ram air outlets configured in accordance with various embodiments of the disclosure.
Figure 5B:
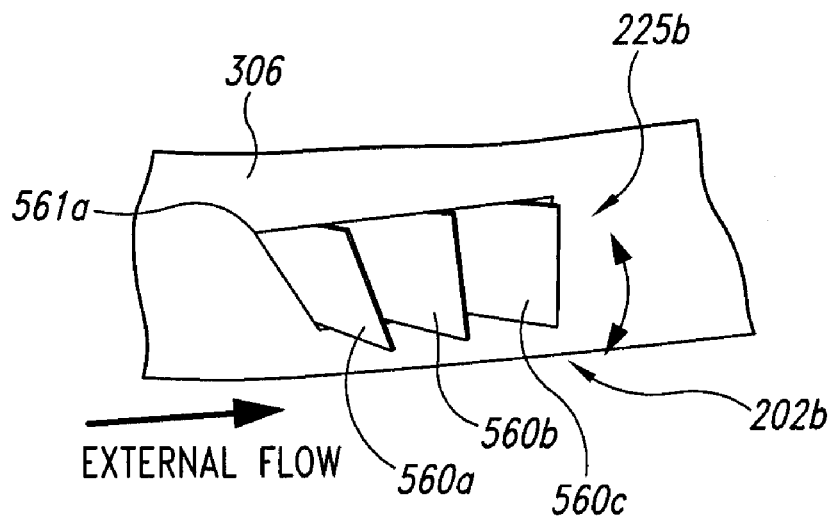

FIG. 5A is a bottom isometric view of a modulated ram air outlet 202a configured in accordance with an embodiment of the disclosure, and FIG. 5B is a bottom isometric view of a modulated ram air outlet 202b configured in accordance with another embodiment of the disclosure. Referring first to FIG. 5A, the ram air outlet 202a includes an aft-facing scoop 530 that can pivot open and closed about a hinge line 531 to vary the outlet opening 225a. Referring next to FIG. 5B, the modulated ram air outlet 202b can include a plurality of louvers 560 (identified individually as louvers 560a-c) which pivot about corresponding hinge lines 561 to open and close and thereby vary the outlet opening 225b. Regardless of which type of ram air outlet is used, the contour of the outlet opening and the modulation device can be selected to minimize or at least reduce exit losses and maximize or at least increase thrust recovery.

Although two types of ram air outlet are described above with reference to FIGS. 5A and 5B, those of ordinary skill in the art will appreciate that the present disclosure can utilize other types of modulated ram air outlets, such as those designed to provide efficient thrust recovery in accordance with the present disclosure. Accordingly, the present disclosure is not limited to the particular types of modulated ram air outlets described above.

In one embodiment of the present disclosure, it is important to control the relationship between the inlet and exit areas of the ram air architecture 200 described above with reference to FIG. 2, to maintain a relatively high pressure recovery in the inlet duct 209 over a wide range of mass flow rates. One process for determining the proper relationship between the inlet and exit areas is described below with reference to FIG. 6A-8C. In general, this process involves using ram system data acquired from, e.g., flight test, wind tunnel test, or computational fluid dynamics simulation, to determine the inlet/exit relationship that provides optimum (or at least near-optimum) pressure recovery and minimized or at least reduced ram system drag over the range of possible mass flow rates.

Figure 6A:
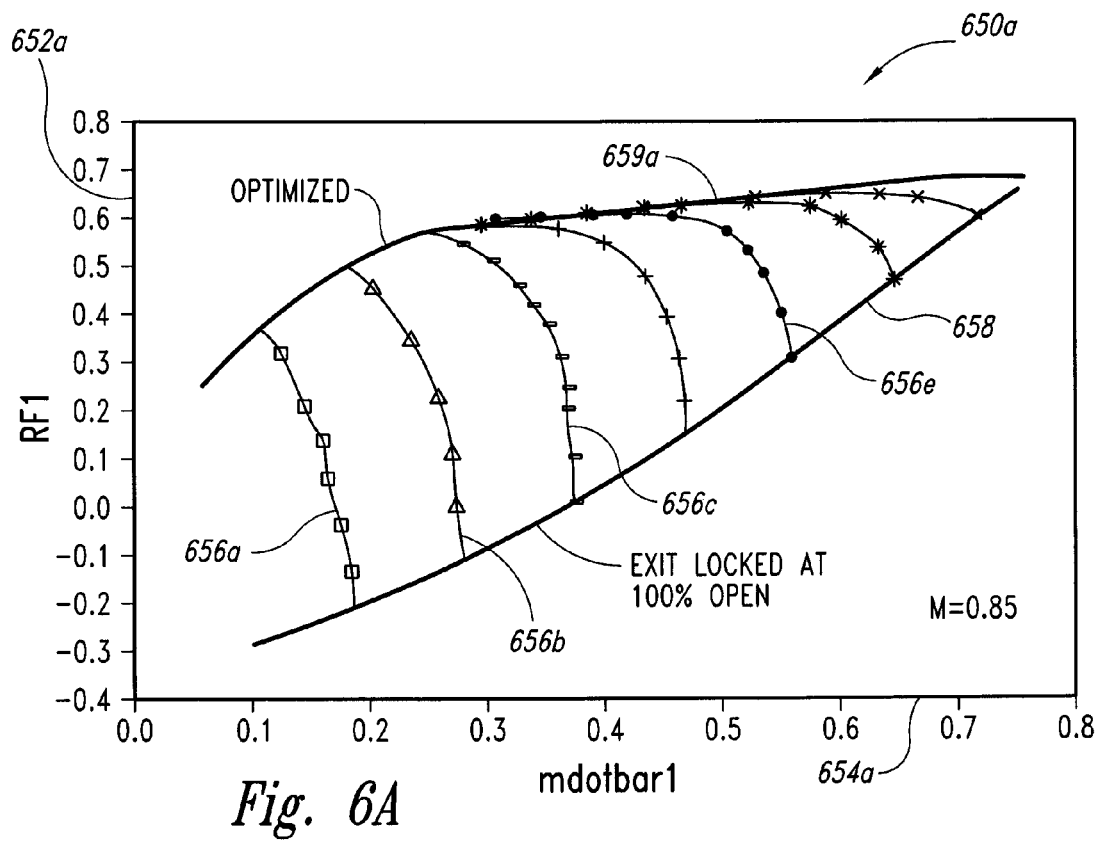
FIG. 6A is a graph illustrating inlet pressure recovery factor versus mass flow for an aircraft environmental control system inlet duct in accordance with an embodiment of the disclosure.

FIG. 6A illustrates a graph 650a of data (e.g., wind tunnel data) for a number of fixed ECS inlet positions and a number of outlet positions corresponding to each fixed inlet position. Pressure recovery factory RF1 is measured along a vertical axis 652a, and non-dimensional mass flow through the system is measured along a horizontal axis 654a. The graph 650a includes a plurality of curves 656 (identified individually as curves 656a-e) which represent a range of outlet positions for each fixed inlet position. For example, the first curve 656a illustrates RF1 as a function of mass flow for an inlet fixed at 10% open, while the outlet varies from a closed position up to 100% open. The second curve 656b illustrates the performance with the inlet fixed at 20% open, the third curve 656e represents the 30% open position, and so on. From the data in graph 650a, optimum inlet and outlet positions, as illustrated by a plot 659a, can be determined for each mass flow in the range. Implementation of these inlet/outlet positions can: maximize or at least increase RF1 at any mass flow; minimize or at least reduce the net ram system drag at any mass flow; and avoid or at least reduce Helmholtz resonance in the inlet duct 209 (FIG. 2).

Figure 6B:
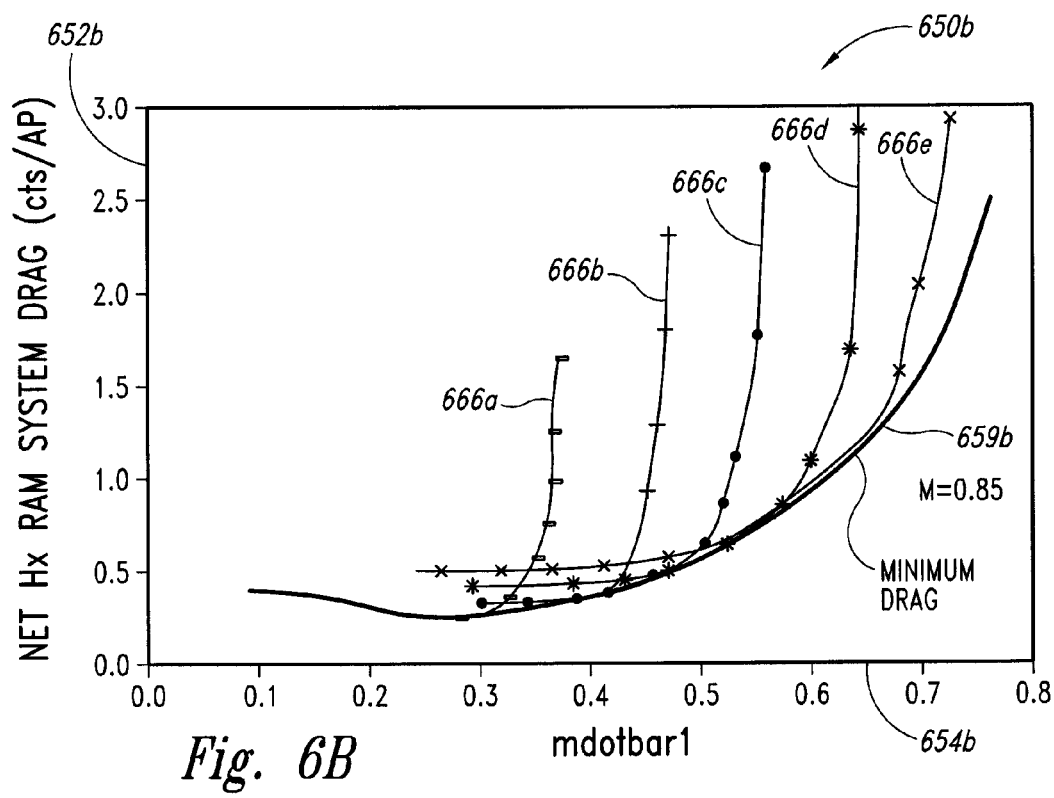
FIG. 6B is a graph illustrating aerodynamic drag of a ram air inlet system versus mass flow in accordance with another embodiment of the disclosure.

FIG. 6B illustrates a graph 650b showing net ram system drag as a function of mass flow, for a series of fixed inlet positions and several corresponding outlet or exit positions. Net system drag is measured along a vertical axis 652b, and non-dimensional mass flow is measured along a horizontal axis 654b. The graph 650b includes a plurality of curves 666 (identified individually as curves 666a-e) which represent the net system drag as a function of mass flow for a plurality of fixed inlet positions as the outlet position varies. For example, the first curve 666a represents the net system drag as a function of mass flow for a fixed inlet position of 40% open and a range of corresponding exit positions. Similarly, the second curve 666b corresponds to a fixed inlet position of 50% open, the third curve 666c corresponds to a fixed inlet position of 60% open, and so on. The data illustrated in the graph 650b can be used to generate a plot 659b that represents the minimum net system drag achievable across the range of mass flow.

Figure 7A:
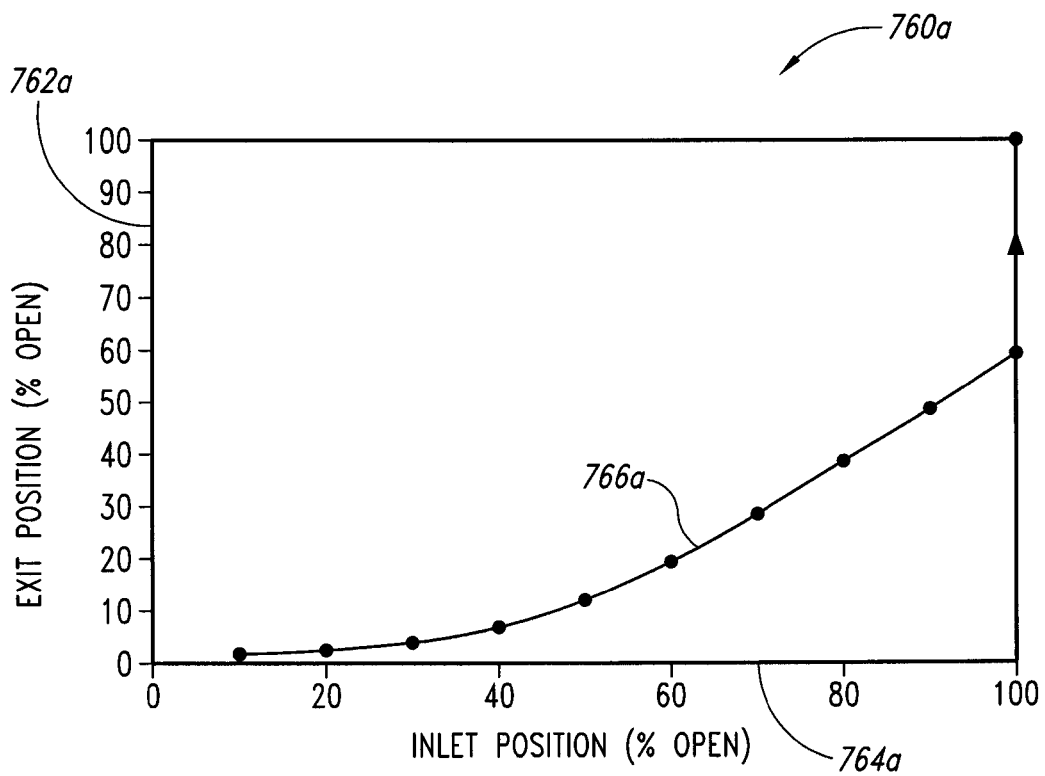
FIG. 7A is a graph illustrating a relationship between a ram air inlet opening and a ram air outlet opening in accordance with an embodiment of the disclosure.

As the discussion above illustrates, the plot 659a in FIG. 6A illustrates the relationship between the ram inlet position and the ram outlet position to achieve the optimum pressure recovery factor across the range of desired mass flows. The plot 659b shown in FIG. 6B illustrates the inlet and outlet relationships that yield the lowest net system drag at each of the mass flows. FIG. 7A illustrates a graph 760a in which the data from FIGS. 6A and 6B is combined to yield the optimum relationship between the inlet and outlet positions to produce the minimum net ram system drag while optimizing the pressure recovery factor. In FIG. 7A, outlet or exit position (in % of exit open) is measured along a vertical axis 762a, and inlet position (in % of inlet open) is measured along a horizontal axis 764a. The plot 766a illustrates the relationship between the inlet and exit positions that yields the optimum, or near-optimum, pressure recovery factor and net system drag.

Figure 7B:
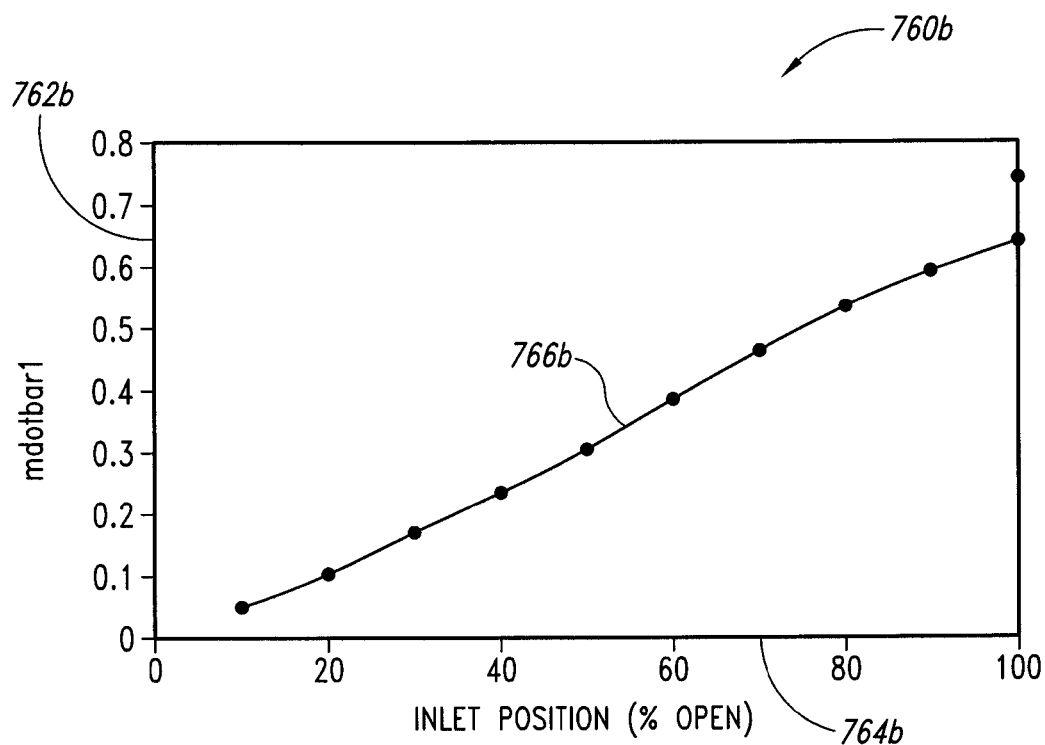
FIG. 7B is a graph illustrating air mass flow as a function of the inlet/exit relationship of FIG. 7A in accordance with another embodiment of the disclosure.

FIG. 7B illustrates a graph 760b showing the mass flow obtained while maintaining the optimal relationship between the inlet and exit positions shown in FIG. 7A. In FIG. 7B, mass flow is measured along a vertical axis 762b, and inlet position (in % open) is measured along a horizontal axis 764b. A plot 766b represents the mass flow obtained while maintaining the optimum inlet and exit position relationship, as a function of inlet position. With the information provided in FIGS. 7A and 7B, optimum, or near-optimum, inlet/outlet positions can be selected for any desired mass flow.

Figure 8A:
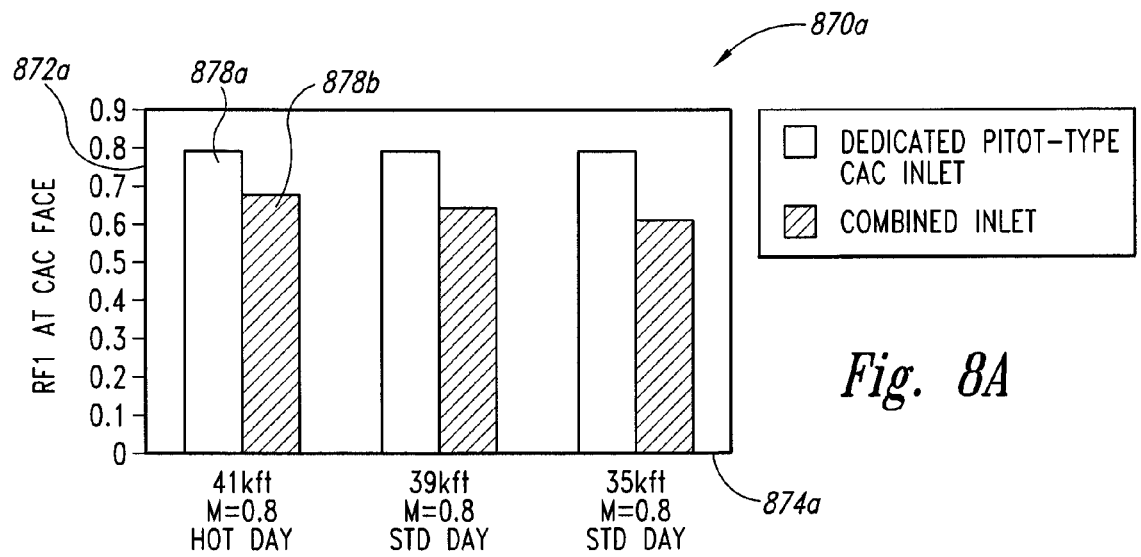
FIGS. 8A-8C illustrate air pressure recovery factors at cabin air compressor inlets, cabin air compressor power requirements, and environmental control system drag at various flight conditions in accordance with embodiments of the disclosure.
Figure 8B:
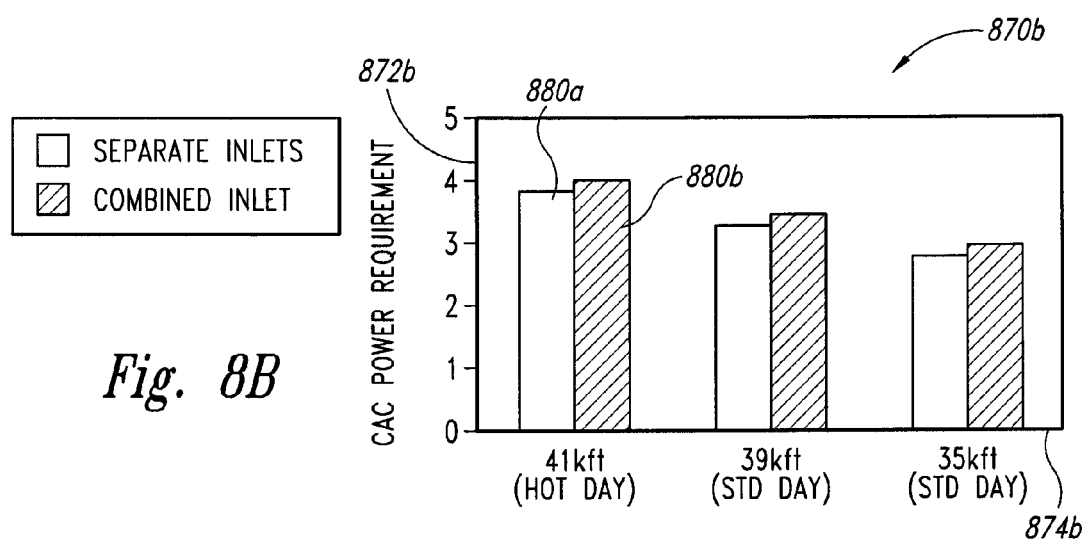
Figure 8C:
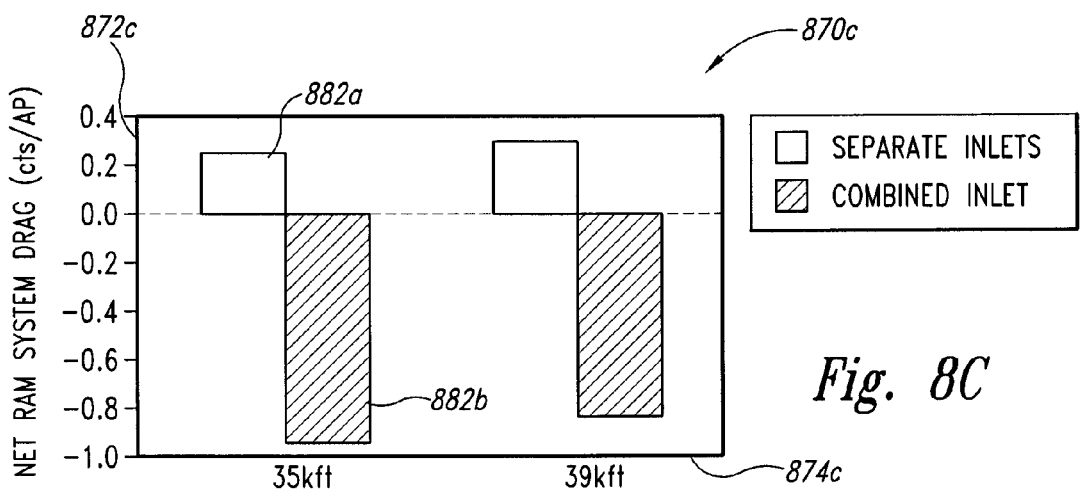

FIGS. 8A-8C compare the performance of an ECS ram system having a combined inlet, as shown in FIG. 2, to an ECS ram system having a dedicated pitot-type cabin air compressor inlet, as shown in FIG. 1. Referring first to FIG. 8A, this Figure illustrates a bar graph 870a in which recovery factors RF1 are measured along a vertical axis 872a, and a number of different flight conditions are identified on a horizontal axis 874a. A first bar 878a represents the performance of a two inlet ECS (e.g., FIG. 1) having a dedicated CAC inlet, and a second bar 878b represents the performance of a combined inlet ECS (e.g., FIG. 2), at a given flight condition (e.g., 41,000 feet, Mach no. 0.8, hot day). As the data in bar graph 870a shows, the two inlet ECS having a dedicated pitot-type CAC inlet performs better than the combined inlet ECS at the three flight conditions shown.

FIG. 8B illustrates a graph 870b that compares CAC power requirements for the combined inlet ECS to the CAC power requirements for two inlet ECS. CAC power requirements are measured along a vertical access 872b, and a number of different flight conditions are identified on a horizontal axis 874b. A first bar 880a represents the CAC power requirement for the two inlet ECS, and a second bar 880b represents the CAC power requirement for the combined inlet ECS. As this data illustrates, the combined inlet ECS requires more CAC power at each of the flight conditions shown.

FIG. 8C illustrates a graph 870c that compares net ram system drag for the combined inlet ECS to the net ram system drag for the two inlet ECS, at two different flight conditions. Net ram system drag is measured along a vertical axis 872c, and the two flight conditions are identified on a horizontal axis 874c. A first bar 882a represents the net system drag associated with the 2 inlet ECS, and a second bar 882b represent the drag associated with the combined inlet ECS. As the graph 870c illustrates, the combined inlet ECS architecture causes less net ram system drag on the aircraft at each of the two flight conditions shown.

The data presented in FIGS. 8A-8C illustrate that while the combined inlet ECS architecture may result in higher CAC power requirements and slightly lower air pressure recovery in the inlet duct, the benefits gained in aerodynamic drag reduction outweigh these effects. By way of example, in one embodiment, the fuel burn penalty associated with the increased CAC power requirements results in a 0.05% reduction in fuel efficiency, but the corresponding reduction in drag from combining the two ram air inlet results in a 0.4% increase in fuel efficiency. Thus, the net fuel burn savings resulting from implementation of a combined inlet ECS architecture can equate to about a 0.35% increase in fuel efficiency. Moreover, there may be additional benefits in terms of reduced aircraft system weight from elimination of two CAC inlets and two actuated foreign object debris (FOD) door assemblies, as well as reduced recurring costs associated with manufacture and maintenance. Elimination of pitot-type CAC inlets can also eliminate the corresponding anti-icing heaters which may be required for operation of those inlets under icing conditions.

Figure 9:
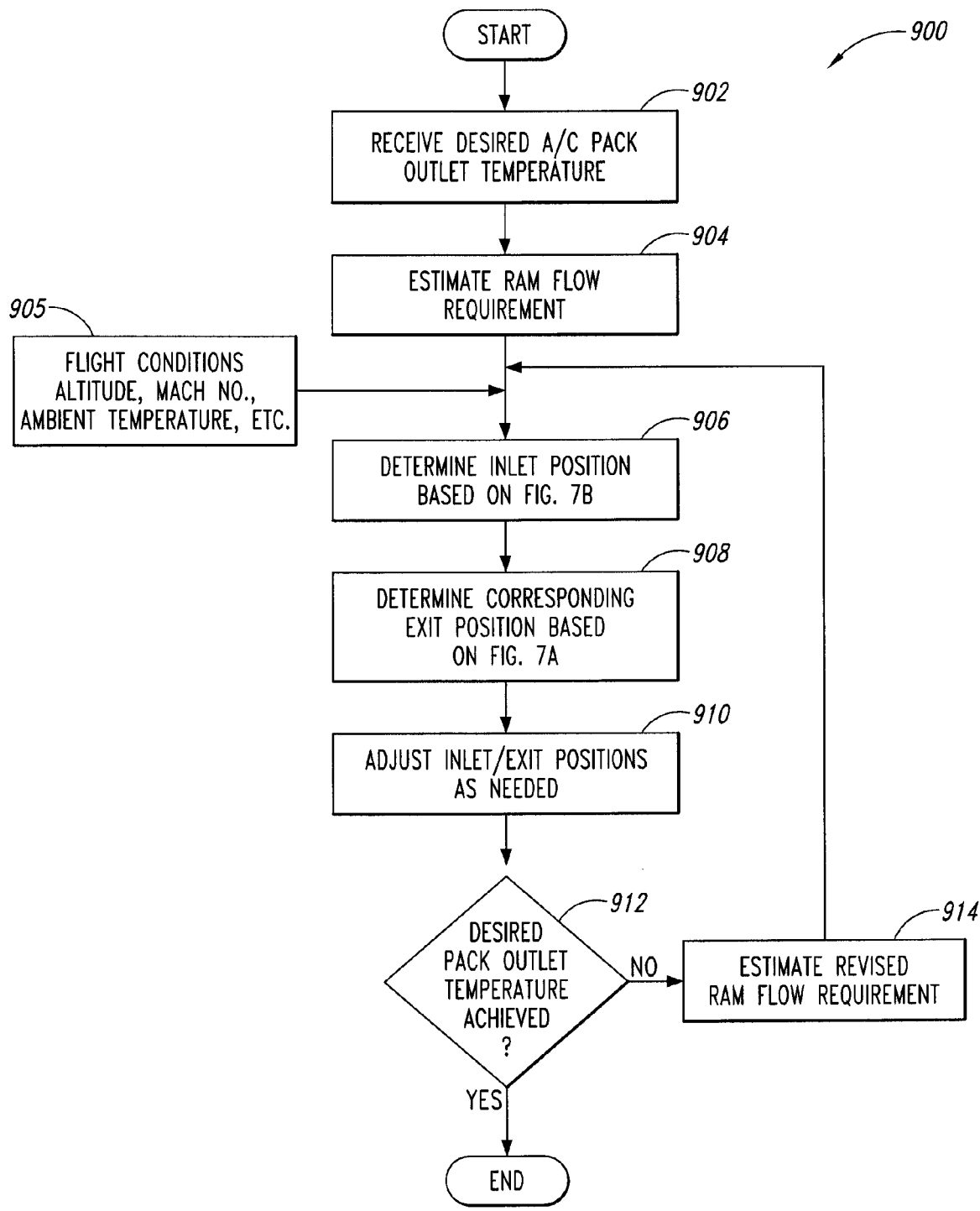
FIG. 9 is a flow diagram of a routine for modulating an environmental control system ram air inlet and/or an associated ram air outlet in accordance with an embodiment of the disclosure.

FIG. 9 is a flow diagram illustrating a routine for modulating a ram air inlet and/or an associated ram air outlet in accordance with an embodiment of the disclosure. In one aspect of this embodiment, the routine 900 can be implemented by the controller 220 in the ECS architecture 200 described above with reference to FIG. 2. In block 902, the routine receives a desired air conditioning pack outlet temperature. In block 904, the routine estimates a ram air flow requirement. The ram flow requirement can depend on altitude, Mach number, ambient temperature, and/or other flight conditions, as shown in block 905. In block 906, the routine determines an inlet position based on FIG. 7B discussed above. In block 908, the routine determines a corresponding exit position based on FIG. 7A discussed above. In block 910, the routine adjusts the inlet/exit positions in accordance with blocks 906 and 908. In decision block 912, the routine determines if the desired air conditioning pack outlet temperature has been achieved. If so, the routine ends. If not, the routine proceeds to block 914 and estimates a revised ram flow requirement. After block 914, the routine returns to block 906 and repeats.

The routine described above with reference to FIG. 9 for modulating a ram air inlet and/or an associated ram air outlet can be implemented with various types of ECS architectures, including the ECS architecture 100 described above with reference to FIG. 1 and the ECS architecture 200 described above with reference to FIG. 2. In the embodiment of FIG. 1, for example, a first portion of ram air can be received from a dedicated cabin air inlet, compressed with an electric motor-driven compressor, conditioned in an air conditioning pack, and then cooled in a heat exchanger before flowing into the cabin. A second portion of ram air can be received from a modulated ram air inlet, supplied to the heat exchanger to cool the first portion of ram air, and then discharged overboard through a modulated ram air outlet. In this embodiment, the ECS architecture can further include a controller operably coupled to the ram air inlet and the ram air outlet. The controller can automatically modulate the variable inlet opening of the ram air inlet in conjunction with the variable outlet opening of the ram air outlet during operation of the aircraft to reduce the aerodynamic drag associated with the ECS ram system.

In a similar embodiment, the first portion of air can be received from an engine bleed system, instead of the dedicated cabin air inlet. The first portion of air is then conditioned in the air conditioning pack and cooled in the heat exchanger before flowing into the cabin. In this embodiment, the second portion of ram air can be received from a modulated ram air inlet as described above, and supplied to the heat exchanger to cool the first portion of ram air. The second portion of air is then discharged overboard through a modulated ram air outlet. The controller can automatically modulate the variable inlet opening of the ram air inlet in conjunction with the variable outlet opening of the ram air outlet during operation of the aircraft to reduce the aerodynamic drag associated with the ECS ram system.

Although not required, portions of the routine 900 can be embodied in computer-executable instructions, such as instructions executed by a computer, e.g., the controller 220 of FIG. 2. Those skilled in the relevant art will appreciate that the invention can be practiced with other computer system configurations, including multi-processor systems, microprocessor-based or programmable electronics, mini-computers, mainframe computers and the like. The routine can be performed by a special purpose computer or data processor that is specifically programmed, configured or constructed to perform the routine. Indeed, the term "computer", as used generally herein, refers to any of the above devices, as well as any data processor. Furthermore, the computer-readable instructions can be stored or distributed on computer-readable media, including magnetic and optically readable and removable computer discs, stored as firmware in chips (e.g., EEPROM chips), as well as distributed electronically over the Internet or over other networks (including wireless networks). Data structures and transmission of data particular to aspects of the invention are also encompassed within the scope of the present disclosure.

From the foregoing, it will be appreciated that specific embodiments of the disclosure have been described herein for purposes of illustration, but that various modifications may be made without deviating from the spirit or scope of the various embodiments of the disclosure. For example, although aspects of the disclosure have been described above in the context of ram air inlets for use with aircraft ECSs, in other embodiments, ram air inlets configured and/or controlled in accordance with aspects of the present disclosure can be used to provide air to other types of aircraft systems, such as aircraft propulsion, auxiliary power, and/or cooling systems. In addition, while various advantages associated with certain embodiments of the disclosure have been described above in the context of those embodiments, other embodiments may also exhibit such advantages, and not all embodiments need necessarily exhibit such advantages to fall within the scope of the disclosure. Accordingly, the invention is not limited, except as by the appended claims

I claim:

1. An environmental control system (ECS) for use with an aircraft, the ECS comprising:
   a ram air inlet door operably coupled to a ram air inlet proximate a fuselage of the aircraft;
   an air conditioning pack that receives a first portion of air from the ram air inlet;
   a heat exchanger that receives a second portion of air from the ram air inlet, wherein the first portion of air from the ram air inlet flows from the air conditioning pack and through the heat exchanger before flowing into a cabin of the aircraft, and wherein the second portion of air from the ram air inlet cools the first portion of air in the heat exchanger;
   a ram air outlet door operably coupled to a ram air outlet that exhausts the second portion of air away from the aircraft after the second portion of air passes through the heat exchanger; and
   means for automatically controlling the ram air inlet door and the ram air outlet door during operation of the ECS to control ram air flow, to increase air pressure recovery downstream from the ram air inlet door, and to reduce aerodynamic drag caused by the ECS, wherein the means for automatically controlling the ram air inlet door and the ram air outlet door include:

means for automatically selecting a position of the ram air inlet door based on a ram air inlet mass flow requirement; and means for automatically selecting a position of the ram air outlet door based on the selected position of the ram air inlet door to thereby increase air pressure recovery downstream from the ram air inlet door and reduce aerodynamic drag.

2. The ECS of claim 1 wherein the ram air inlet is a flush inlet.

3. The ECS of claim 1, further comprising:
an inlet duct in flow communication with the ram air inlet;
an air passage in flow communication with the inlet duct; and
a cabin air compressor operably coupled to the air passage,
wherein the first portion of air from the ram air inlet flows through the air passage to the cabin air compressor before flowing through the air conditioning pack,
wherein the air conditioning pack includes at least one of an air cycle device and a vapor cycle device, and
wherein the first portion of air flows through the air conditioning pack before flowing through the heat exchanger.

4. The ECS of claim 1, further comprising:
an inlet duct in flow communication with the ram air inlet and the ram air outlet;
an air passage in flow communication with the inlet duct;
a cabin air compressor operably coupled to the air passage,
wherein the first portion of air from the ram air inlet flows through the air passage to the cabin air compressor before flowing through the air conditioning pack and the heat exchanger, wherein the air conditioning pack includes at least one of an air cycle device and a vapor cycle device, and wherein the second portion of air flows out the ram air outlet after flowing through the heat exchanger.

5. The ECS of claim 1, further comprising:
an inlet duct in flow communication with the ram air inlet and the ram air outlet;
a cabin air compressor,
wherein the first portion of air from the ram air inlet flows through the cabin air compressor before flowing through the air conditioning pack,
wherein the air conditioning pack includes at least one of an air cycle device and a vapor cycle device,
wherein the first portion of air flows through the air conditioning pack before flowing through the heat exchanger, and
wherein the second portion of air flows out the ram air outlet after flowing through the heat exchanger; and
wherein the means for automatically controlling modulates the ram air inlet door and the ram air outlet door during operation of the ECS to increase pressure recovery in the inlet duct and reduce aerodynamic drag caused by the ECS.

6. The ECS of claim 1 wherein the means for automatically selecting a position of the ram air outlet door include means for automatically selecting a position of the ram air outlet door based on empirical data illustrating the relationship between the ram air outlet door and the ram air inlet door that yields optimum, or near-optimum, pressure recovery factor and net system drag.

7. An environmental control system (ECS) for use with an aircraft, the ECS comprising:
a ram air inlet, wherein the ram air inlet includes:
an inlet lip portion; and
an inlet door movably positioned at least approximately adjacent to the inlet lip portion to form a variable inlet opening therebetween, the inlet door including:
a first surface portion movably positioned upstream of the inlet lip portion, wherein the first surface portion includes a forward edge region spaced apart from the inlet lip portion by a first distance; and
a second surface portion fixed at an angle relative to the first surface portion and movably positioned downstream of the inlet lip portion, wherein the second surface portion includes an aft edge region spaced apart from the forward edge region by a second distance that is greater than the first distance, and wherein movement of the inlet door in a first direction reduces the inlet opening to decrease a flow of ram air through the inlet opening, and wherein movement of the inlet door in a second direction enlarges the inlet opening to increase the flow of ram air through the inlet opening;
an air conditioning pack that receives a first portion of air from the ram air inlet; and
a heat exchanger that receives a second portion of air from the ram air inlet, wherein the first portion of air from the ram air inlet flows from the air conditioning pack and through the heat exchanger before flowing into a cabin of the aircraft, and wherein the second portion of air from the ram air inlet cools the first portion of air in the heat exchanger.

8. The ECS of claim 7, further comprising a ram air outlet that exhausts the second portion of air away from the aircraft after the second portion of air passes through the heat exchanger, wherein the ram air outlet includes a variable outlet opening.

9. An aircraft comprising:
a cabin; and
an environmental control system (ECS) that provides air to the cabin, the ECS comprising:
a ram air inlet having a variable inlet opening in flow communication with an inlet duct;
a ram air outlet having a variable outlet opening in flow communication with an exhaust duct;
an air conditioning pack that receives a first portion of air from the inlet duct, the air conditioning pack including at least one of an air cycle machine and a vapor cycle machine;
a heat exchanger that receives a second portion of air from the inlet duct, wherein the first portion of air flows from the air conditioning pack and through the heat exchanger before flowing into the cabin, and wherein the second portion of air flows through the heat exchanger to cool the first portion of air before flowing out the ram air outlet via the exhaust duct; and
means for automatically selecting positions of the variable inlet opening and the variable outlet opening during operation of the aircraft based on a ram air inlet mass flow requirement and based on data indicating desired positions of the variable inlet opening and the variable outlet opening to increase air pressure recovery in the inlet duct and reduce aerodynamic drag caused by the ECS.

10. The aircraft of claim 9 wherein the cabin is a passenger cabin located in a fuselage of the aircraft.

11. The aircraft of claim 9 wherein the means for automatically selecting modulates at least one of the variable inlet opening and the variable outlet opening during operation of the aircraft to increase pressure recovery in the inlet duct.

12. The aircraft of claim 9 wherein the ECS further comprises:
an air passage in flow communication with the inlet duct; and
a cabin air compressor operably coupled to the air passage, wherein the first portion of air from the ram air inlet flows through the air passage to the cabin air compressor before flowing through the air conditioning pack and the heat exchanger.

13. The aircraft of claim 9 wherein the ECS further comprises:
an air passage in flow communication with the inlet duct; and
a cabin air compressor operably coupled to the air passage, wherein the air conditioning pack is positioned downstream from the cabin air compressor so that the first portion of air from the ram air inlet flows through the air passage to the cabin air compressor before flowing to the air conditioning pack, and
wherein the heat exchanger is positioned downstream from the air conditioning pack so that the first portion of air flows through the air conditioning pack before flowing to the heat exchanger.

14. The aircraft of claim 9 wherein the means for automatically selecting include:
means for automatically selecting a position of the variable inlet opening based on test data illustrating the relationship between inlet opening position and ram air mass flow; and
means for automatically selecting a position of the variable outlet opening based on test data illustrating the relationship between outlet opening position and inlet opening position.

15. A system for providing outside air to a cabin of an aircraft, the system comprising:
means for receiving a flow of outside air while the aircraft is in flight, wherein the means for receiving a flow of outside air include a variable inlet opening;
means for dividing the flow of outside air into a first air flow portion and a second air flow portion;
means for cooling the first air flow portion with the second air portion before providing the first air flow portion to a cabin of the aircraft;
means for exhausting the second air flow portion away from the aircraft after the second air flow portion has cooled the first air portion, wherein the means for exhausting the second air flow portion away from the aircraft include a variable outlet opening; and
means for automatically modulating at least one of the variable inlet opening and the variable outlet opening while the aircraft is in flight to reduce loss of air pressure downstream from the variable inlet opening while simultaneously reducing aerodynamic drag, wherein the means for automatically modulating include:
means for automatically selecting a position of the variable inlet opening based on a ram air inlet mass flow requirement; and
means for automatically selecting a position of the variable outlet opening based on the selected position of the variable inlet opening.

16. The system of claim 15, further comprising means for compressing the first air flow portion before cooling the first air flow portion with the second air flow portion.

17. A method for providing air to an aircraft cabin during flight, the method comprising:
receiving a flow of outside air via an air inlet;
separating the flow of outside air into a first air flow portion and a second air flow portion;
compressing the first air flow portion;
after compressing the first air flow portion, cooling the first air flow portion with the second air flow portion;
after cooling the first air flow portion with the second air flow portion, directing the first air flow portion into the aircraft cabin and exhausting the second air flow portion via an air outlet; and
automatically modulating the air inlet and the air outlet during flight of the aircraft to achieve a desired temperature of the first air flow portion flowing into the aircraft cabin while optimizing pressure recovery and reducing aerodynamic drag,
wherein automatically modulating the air inlet and the air outlet during flight comprises selecting a ram air inlet mass flow requirement based on the desired temperature of the first air flow portion flowing into the aircraft cabin; selecting a position of the air inlet based on the selected ram air inlet mass flow requirement; and selecting a position of the air outlet based on the selected position of the air inlet.

18. The method of claim 17, further comprising:
after compressing the first air flow portion, and before cooling the first air flow portion with the second air flow portion, directing the first air flow portion through an air conditioning pack.

19. The method of claim 17 wherein exhausting the second air flow portion from the aircraft via an outlet includes wherein exhausting the second air flow portion from the aircraft via an outlet having a variable outlet opening.

20. The method of claim 17 wherein receiving a flow of outside air via an air inlet includes receiving a flow of outside air via a ram air inlet.

21. The method of claim 17 wherein receiving a flow of outside air via an air inlet includes receiving a flow of outside air via a flush inlet having a variable inlet opening.

22. The method of claim 17 wherein compressing the first air flow portion includes directing the first air flow portion through an air compressor, wherein cooling the first air flow portion with the second air flow portion includes directing the first air flow portion through a heat exchanger, and wherein the method further comprises directing the first air flow portion through an air conditioning pack after the first air flow portion flows through the air compressor and before the first air flow portion flows through the heat exchanger.

* * * * *